United States Patent
Grossman et al.

(10) Patent No.: US 10,140,000 B2
(45) Date of Patent: Nov. 27, 2018

(54) MULTISCALE THREE-DIMENSIONAL ORIENTATION

(75) Inventors: Tovi Grossman, Toronto (CA); Azam Khan, Aurora (CA); Michael Glueck, Toronto (CA); James McCrae, Brampton (CA)

(73) Assignee: AUTODESK, INC., San Rafael, CA (US)

(*) Notice: Subject to any disclaimer, the term of this patent is extended or adjusted under 35 U.S.C. 154(b) by 646 days.

(21) Appl. No.: 13/193,531

(22) Filed: Jul. 28, 2011

(65) Prior Publication Data

US 2012/0030630 A1  Feb. 2, 2012

Related U.S. Application Data

(60) Provisional application No. 61/369,635, filed on Jul. 30, 2010.

(51) Int. Cl.
*G06F 3/0481* (2013.01)
*G06F 3/0484* (2013.01)
*G06T 19/00* (2011.01)

(52) U.S. Cl.
CPC ...... *G06F 3/04845* (2013.01); *G06F 3/04815* (2013.01); *G06T 19/003* (2013.01); *G06F 2203/04802* (2013.01)

(58) Field of Classification Search
CPC .............. G06F 3/04815; G06F 3/011; G06F 17/30873; G06T 15/00; G06T 17/00; G06T 19/003; A63F 13/06; A63F 2300/6653; A63F 2300/6684
USPC ....................................................... 715/850
See application file for complete search history.

(56) References Cited

U.S. PATENT DOCUMENTS

| 6,791,578 | B1 | 9/2004 | Ubillos |
| 8,397,168 | B2 * | 3/2013 | Leacock ............. H04L 12/1827 715/716 |
| 2005/0028111 | A1 | 2/2005 | Schrag et al. |
| 2007/0139408 | A1 | 6/2007 | Keranen |

(Continued)

FOREIGN PATENT DOCUMENTS

| CN | 101033972 A | 9/2007 |
| JP | 2001-224849 A1 | 8/2001 |

OTHER PUBLICATIONS

Chittaro et al, "3D Location-pointing as a Navigation Aid in Virtual Environments," May 2004, ACM Proceeding of the Working Conference on Advanced Visual Interfaces, Gallipoli, Italy, pp. 1-8.*

(Continued)

*Primary Examiner* — Alvin H Tan
(74) *Attorney, Agent, or Firm* — Artegis Law Group, LLP

(57) ABSTRACT

A multiscale data engine is configured to generate a three-dimensional (3D) environment based on a multiscale 3D dataset. The multiscale data engine is also configured to generate a spatial hierarchy within the 3D environment by selectively grouping 3D objects within the 3D environment. The multiscale data engine is further configured to identify specific 3D objects within the 3D environment in response to input received from an end-user and based on spatial properties associated with the 3D objects. The multiscale data engine is also configured to generate various navigation graphical user interfaces (GUIs) that allow the end-user to navigate the 3D environment.

19 Claims, 15 Drawing Sheets

(56) References Cited

U.S. PATENT DOCUMENTS

| | | | |
|---|---|---|---|
| 2008/0034329 A1* | 2/2008 | Posner | G06F 9/4446 |
| | | | 715/856 |
| 2008/0150921 A1 | 6/2008 | Robertson et al. | |
| 2008/0238916 A1 | 10/2008 | Ghosh et al. | |
| 2009/0169060 A1* | 7/2009 | Faenger | G09B 29/007 |
| | | | 382/113 |
| 2009/0254843 A1* | 10/2009 | Van Wie et al. | 715/757 |
| 2009/0289937 A1 | 11/2009 | Flake et al. | |
| 2009/0293012 A1* | 11/2009 | Alter et al. | 715/810 |
| 2010/0188397 A1* | 7/2010 | Tsai | G06F 1/1626 |
| | | | 345/419 |
| 2011/0265041 A1* | 10/2011 | Ganetakos et al. | 715/834 |
| 2012/0028700 A1* | 2/2012 | Avent et al. | 463/23 |

OTHER PUBLICATIONS

Burigat et al, "Visualizing Locations of Off-Screen Objects on Mobile Devices: A Comparative Evaluation of Three Approaches," Sep. 2006, pp. 239-246.*

MasterCosgrove, "Super Smash Bros. Melee Gameplay #2," Jul. 20, 2009, YouTube video available at http://www.youtube.com/watch?v=q1RE2b2S6n9s.*

International Search Report International Application No. PCT/US11/46026, dated Dec. 19, 2011.

Written Opinion of the International Searching Authority, International Application No. PCT/US11/46026, dated Dec. 19, 2011.

Extended European Search Report dated Aug. 22, 2014, Application No. EP 11813292.7, 6 pages.

McCrae et al., "Exploring the Design Space of Multiscale 3D Orientation", Conference on Advanced Visual Interfaces, May 25-29, 2010, 8 pages.

* cited by examiner

MULTISCALE THREE-DIMENSIONAL ORIENTATION

CROSS-REFERENCE TO RELATED APPLICATIONS

This application claims benefit of U.S. provisional patent application Ser. No. 61/369,635, filed Jul. 30, 2010, which is hereby incorporated herein by reference.

BACKGROUND OF THE INVENTION

Field of the Invention

The present invention relates to the field of computer animation and, in particular, to multiscale three-dimensional (3D) orientation.

Description of the Related Art

More recent research in 3D computer graphics and interaction has moved beyond the narrow domain of single object authoring and inspection and has begun to consider complex multiscale objects and environments. Conventional computer graphics approaches to modeling and understanding design spaces, while well understood, have proven somewhat limited with respect to these new and more complex graphics environments. To properly and more efficiently work in these new graphics environments, a richer understanding of the design space is required.

As the foregoing illustrates, there is a need in the art for improved techniques for understanding and interacting with complex multiscale 3D environments.

SUMMARY OF THE INVENTION

One embodiment of the invention includes a computer-implemented method for generating a navigation graphical user interface (GUI) for navigating a three-dimensional (3D) environment associated with a multiscale 3D dataset. The method includes receiving a current position within the 3D environment, where a visible portion of the 3D environment is rendered for display from the perspective of the current position, identifying a 3D object that resides within a non-visible portion of the 3D environment, and causing an object indicator to be displayed within the visible portion of the 3D environment, where the object indicator has an orientation that indicates the position of the 3D object within the non-visible portion of the 3D environment relative to the current position.

Advantageously, an end-user is provided with various ways to interact with a complex 3D environment that includes observable properties at a wide variety of different scales. Such approaches are crucial to engaging users with the visually immersive details that are associated with each distinct scale of such 3D environments.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
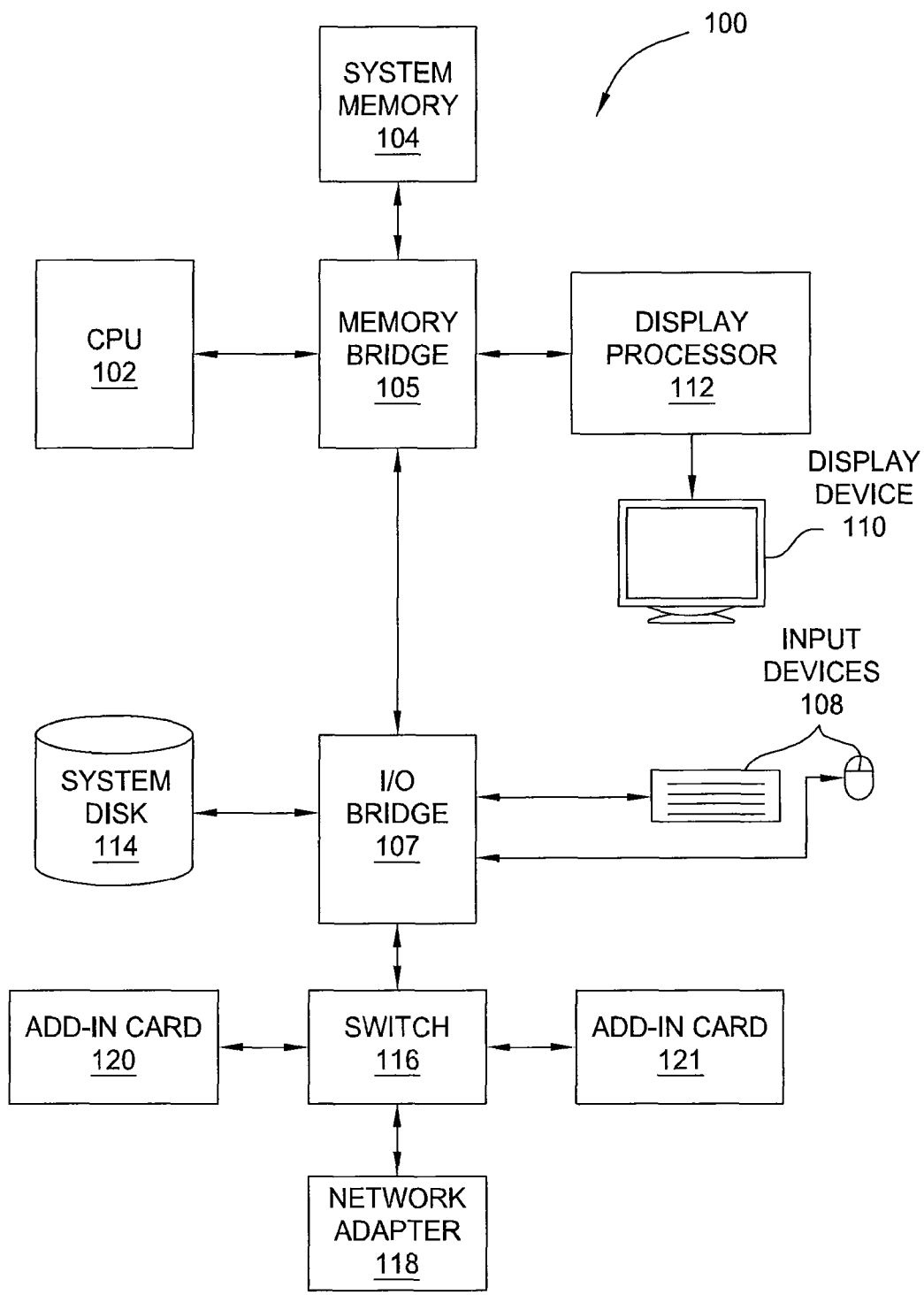
FIG. 1A is a block diagram of a system configured to implement one or more aspects of the invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Hardware Overview

FIG. 1 depicts one architecture of a system 100 within which embodiments of the present invention may be implemented. This figure in no way limits or is intended to limit the scope of the present invention. System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Software Overview

Figure 1B:
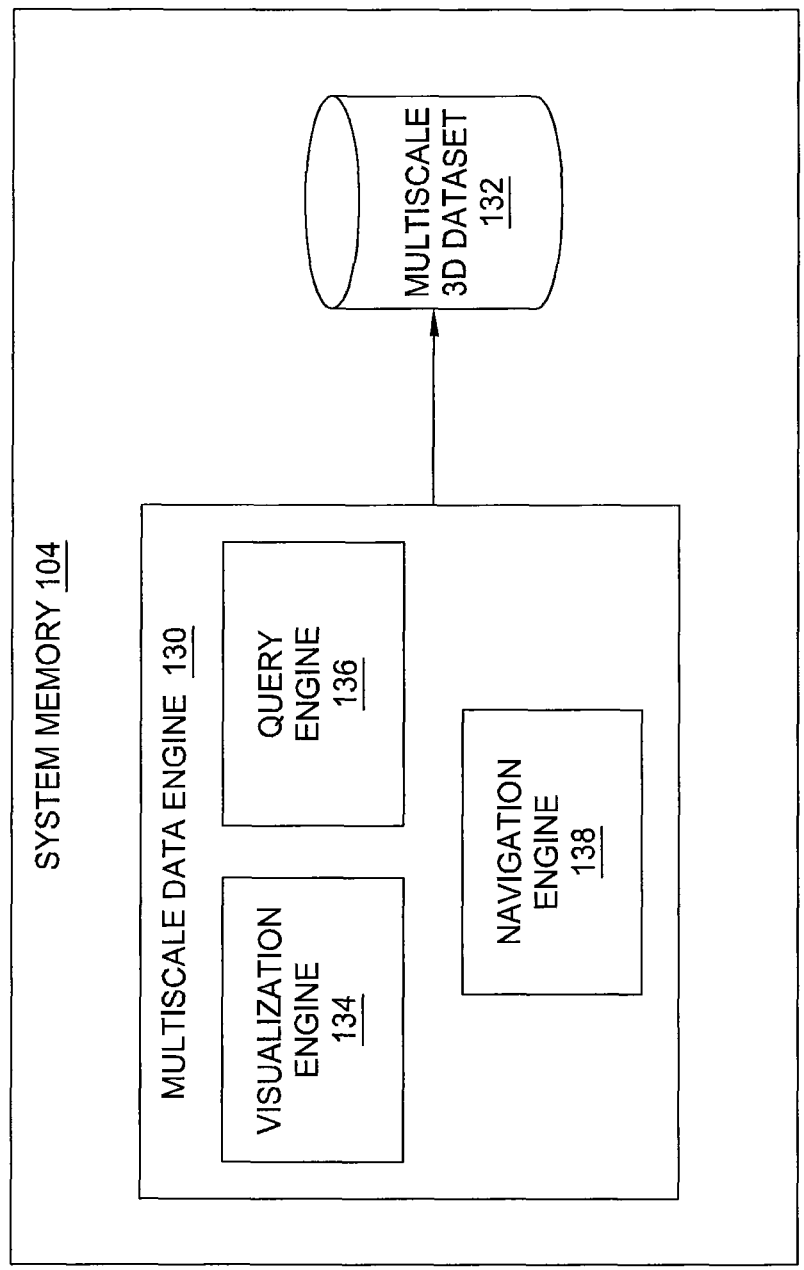
FIG. 1B is a more detailed illustration of the system memory of FIG. 1A, according to one embodiment of the invention.

FIG. 1B is a more detailed illustration of the system memory 104 of FIG. 1A, according to one embodiment of the invention. As shown, system memory 104 includes a multiscale data engine 130 that is configured to access a multiscale 3D dataset 132 Multiscale 3D dataset 132 represents a 3D environment that may have observable properties at multiple different scales.

For example, multiscale 3D dataset 132 could be a geospatial dataset that represents a 3D model of planet Earth. In this example, multiscale 3D dataset 132 could include a large sphere, representing Earth, which corresponds to a "planetary" scale. Further, multiscale 3D dataset 132 could include groups of 3D rectangles disposed on the surface of the sphere, representing cities, which correspond to a "city" scale. Within a given "city," each "building" could include various building elements, such as, e.g., beams, girders, stairs, or windows, which correspond to a "building" scale. Those skilled in the art will recognize that multiscale 3D dataset 132 may represent any type of 3D environment, and, additionally, may do so using a wide variety of possible data structures and/or data formats.

In one embodiment, multiscale 3D dataset 132 represents a 3D environment based on data derived from a geographic information system (GIS) database. For example, multiscale 3D dataset 132 could represent a 3D elevation map where each point in the map has a unique GIS tag. Multiscale 3D dataset 132 may also implement a different data structure and/or data format to represent each different scale within the 3D environment. For example, multiscale 3D dataset 132 could represent a 3D model of a city as various point clouds that each corresponds to a different building within the city. Each point cloud could be positioned, at a "planetary" scale, using GIS data. At a smaller "building" scale, the points within a given point cloud could be defined relative to the GIS tag of that point cloud.

Multiscale 3D dataset 132 may represent a 3D environment using one or more different 3D datasets that each corresponds to a different scale of that 3D environment. In some embodiments, each 3D dataset within multiscale 3D dataset 132 is aligned with the other 3D datasets or nested within multiscale 3D dataset 132 relative to other 3D datasets. As further described below, the 3D environment associated with multiscale 3D dataset 132 can be accessed by an end-user using multiscale data engine 130.

Multiscale data engine 130 includes a visualization engine 134, a query engine 136, and a navigation engine 138, each of which is configured to perform various processing operations with multiscale 3D dataset 132. An end-user may issue commands to the various engines within multiscale data engine 130 via input devices 108, and may receive output generated by those engines via display device 110. As described in greater detail below in conjunction with FIGS. 2 and 10, visualization engine 134 is configured to render a 3D environment based on multiscale 3D dataset 132 for output to display device 110. Query engine 136 is configured to identify 3D objects within multiscale 3D dataset 132 based on queries received from an end-user via input devices 108, as described in greater detail below in conjunction with FIGS. 2 and 11. Navigation engine 138 is configured to generate various navigation GUIs based on multiscale 3D dataset 132 in order to allow an end-user to navigate the 3D environment associated with multiscale dataset 132, as described in greater detail below in conjunction with FIGS. 3-9 and 12.

Visualizing, Querying, and Navigating Multiscale 3D Datasets

Figure 2:
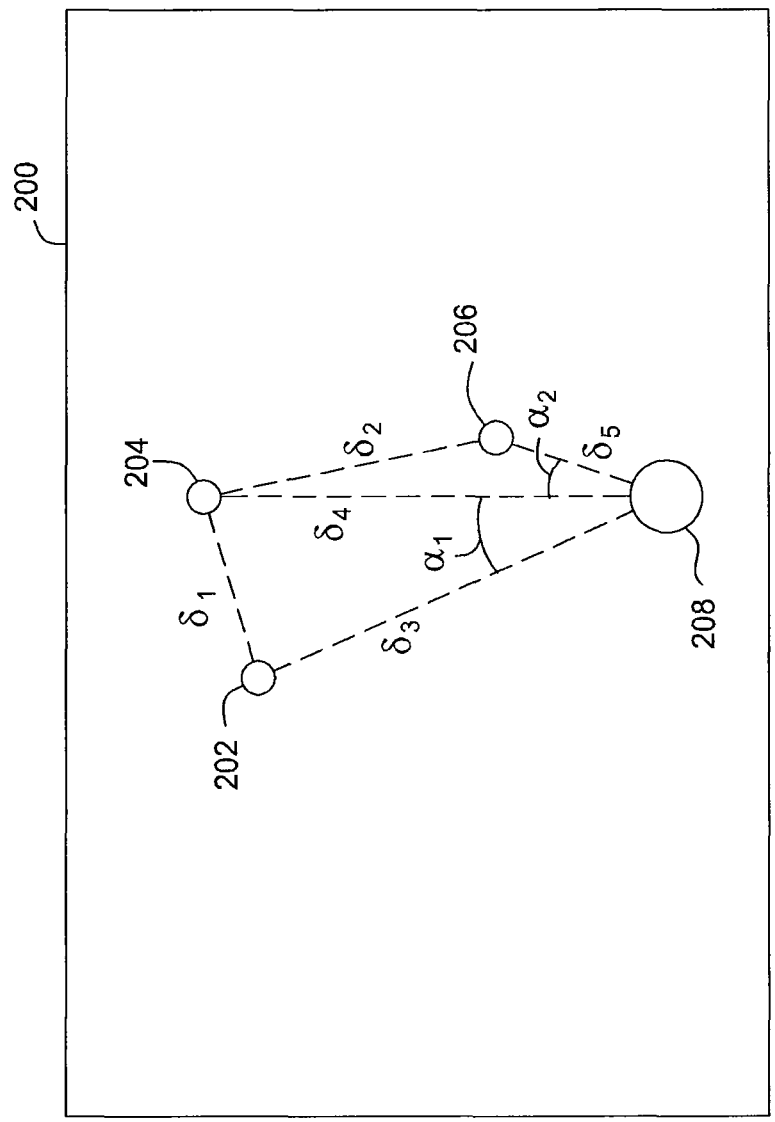
FIG. 2 illustrates various elements residing within a 3D scene, according to one embodiment of the invention.

FIG. 2 illustrates a third-person perspective of various elements residing within a 3D scene 200, according to one embodiment of the invention. 3D scene 200 may represent a third-person snapshot of the 3D environment associated with multiscale 3D dataset 132, as described above in conjunction with FIG. 1B. As shown, 3D scene 200 includes 3D objects 202, 204, and 206, as well as a camera 208. Visualization engine 134, described above in conjunction with FIG. 1B, is configured to render an image for display to an end-user from the perspective of camera 208.

Visualization engine 134 is also configured to generate a "spatial hierarchy" of 3D objects within the 3D environment by selectively grouping the 3D objects based on spatial properties associated with those objects. In this fashion, visualization engine 134 may "clean up" the 3D environment by reducing the number of visible 3D objects, as described by way of example herein.

Visualization engine 134 is configured to group two or more of 3D objects 202, 204, and 206 based on the linear distances between those objects, the angular distances between those objects relative to camera 208, and/or based on the distances between those objects and camera 210. In 3D scene 200, $\delta_1$ represents the linear distance between 3D objects 202 and 204, $\delta_2$ represents the linear distance between 3D objects 204 and 206, $\alpha_1$ represents the angular distance between 3D objects 202 and 204, and $\alpha_2$ represents the angular distance between 3D objects 204 and 206. Additionally, $\delta_3$, $\delta_4$, and $\delta_5$ represent the distances between 3D objects 202, 204, and 206 and camera 208, respectively.

In one embodiment of the invention, visualization engine 134 may be configured to group two or more of 3D objects 202, 204, and 206 when the linear distance between those objects is less than a given linear threshold. For example, if $\delta_1$ is less than the linear threshold, then visualization engine 134 would group 3D objects 202 and 204.

In another embodiment of the invention, visualization engine 134 may be configured to group two or more of 3D objects 202, 204, and 206 when the angular distance between those objects relative to camera 208 is less than a given angular threshold. For example, if $\alpha_2$ is less than the angular threshold, then visualization engine 134 would group 3D objects 204 and 206.

In yet another embodiment of the invention, visualization engine 134 may be configured to group two or more of 3D objects 202, 204, and 206 based on any combination of linear distance between the 3D objects, angular distance between the 3D objects relative to camera 208, or distance between each 3D object and camera 208.

When rendering an image for display, visualization engine 134 may represent groups of 3D objects as a single 3D object that represents the group. For example, when grouping 3D objects 202 and 204, visualization engine 134 could render a single 3D object that represents that group. In this fashion, visualization engine 134 may reduce the complexity of a 3D scene having numerous 3D objects. Those skilled in the art will recognize that visualization engine 134 may group any number of 3D objects together based on a wide variety of spatial properties associated with those 3D objects, and that the examples described above are for illustrative purposes only.

Referring again to 3D scene 200 of FIG. 2, query engine 136 is configured to identify one or more of 3D objects 202, 204, and 206 based on the spatial properties associated with those objects. Through this technique, query engine 136 allows the end-user to conduct a search of the 3D objects associated with multiscale 3D dataset 132 in order to determine particular 3D objects that match search criteria. For example, the end-user may wish to search for 3D objects positioned within a particular distance of camera 208. If that distance is less than $\delta_5$, yet greater than $\delta_3$ and $\delta_4$, then query engine 136 could identify 3D object 206 for the end-user.

Query engine 136 is also configured to conduct a search of the 3D objects associated with multiscale 3D dataset 132 based on other, non-spatial properties of those 3D objects. For example, query engine 136 may identify one or more 3D objects based on descriptions of those objects, whether those objects have been grouped by visualization engine 134, or the scale at which those 3D objects reside, among other things. Query engine 136 may also identify one or more 3D objects based on any combination of different properties associated with those objects. Once query engine 136 has identified one or more 3D objects, query engine 136 may cause an indication of those objects to be displayed to the end-user. Those skilled in the art will recognize that query engine 136 may conduct a search of the 3D objects associated with multiscale 3D dataset 132 based on a wide variety of spatial and/or non-spatial properties, and that the examples described above are for illustrative purposes only.

In addition to providing techniques for visualizing and searching multiscale 3D dataset 132, multiscale data engine 130 also provides various techniques for navigating the 3D environment represented by multiscale 3D dataset 132. Specifically, navigation engine 138 within multiscale data engine 130 is configured to generate various navigation GUIs that allow the end-user to navigate that 3D environment, as described in greater detail below in conjunction with FIGS. 3A-9 and 12.

Figure 3A:
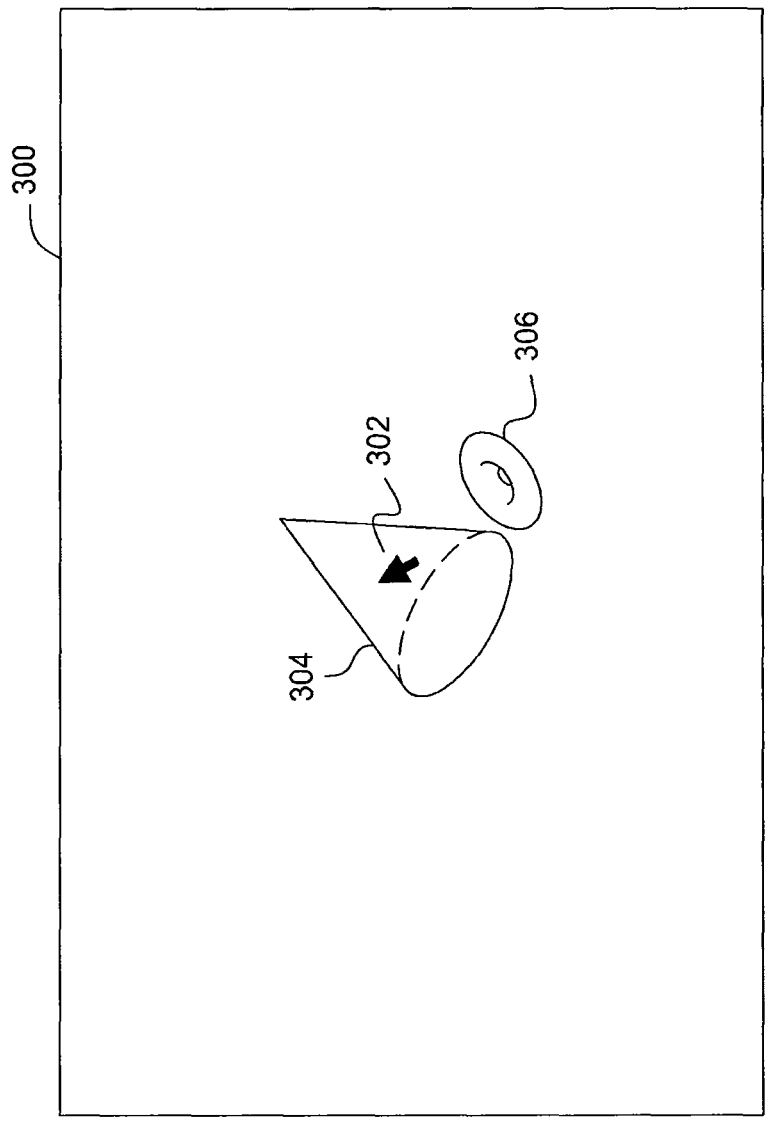
FIGS. 3A-9 illustrate different screenshots of a 3D environment, according to one embodiment of the invention.

FIG. 3A illustrates a screenshot 300 of a 3D environment, according to one embodiment of the invention. Screenshot 300 represents an image that may be generated by visualization engine 134 from the perspective of camera 208, as described in conjunction with FIG. 2. Screenshot 300 represents the 3D environment associated with multiscale 3D dataset 132, and may be displayed to the end-user via display device 110. As shown, screenshot 300 includes a cursor 302, a direction cone 304, and a 3D thumbnail image 306.

Navigation engine 138 is configured to generate direction cone 304 in order to indicate an off-screen 3D object within the 3D environment. In the exemplary embodiment shown in FIG. 3A, the off-screen object resides towards the upper-right, behind the perspective from which screenshot 300 was captured. When the end-user hovers cursor 302 over direction cone 304, navigation engine 138 generates 3D thumbnail image 306. 3D thumbnail image 306 represents the off-screen object (in this case, the off-screen object is a torus). Navigation engine 138 may cause 3D thumbnail image 306 to rotate in order to represent the off-screen object from various perspectives and may scale 3D thumbnail image 306 to an appropriate size. Additionally, when an end-user selects direction cone 304 using cursor 302, navigation engine 138 may navigate the end-user to the 3D object represented by direction cone 304, i.e. navigation engine 138 may change the camera position associated with the end-user such that the 3D object is on-screen. Navigation engine 138 is also configured to generate direction cones that represent groups of 3D objects, as described in greater detail below in conjunction with FIG. 3B.

Figure 3B:
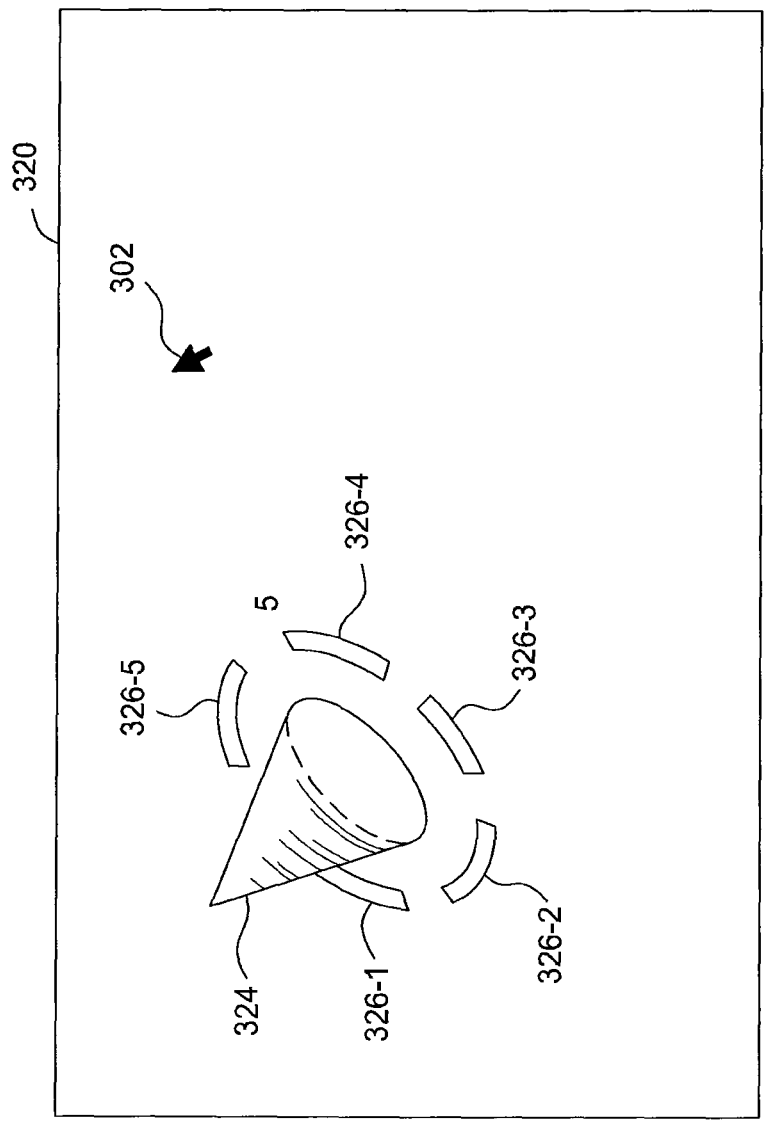

FIG. 3B illustrates a screenshot 320 of a 3D environment, according to one embodiment of the invention. Like screenshot 300 in FIG. 3A, screenshot 320 may be generated by visualization engine 134 in order to represent the 3D environment associated with multiscale 3D dataset 132. As shown, screenshot 320 includes cursor 302, direction cone 324, and segmented disk 326. Segmented disk includes disk segments 326-1 through 326-5.

Navigation engine 138 is configured to generate direction cone 324 in order to indicate an off-screen group of 3D objects within the 3D environment. The off-screen group of 3D objects may be generated by, e.g., visualization engine 134. In the exemplary embodiment shown in FIG. 3B, the off-screen group of 3D objects resides towards the upper-left, behind the perspective from which screenshot 320 was captured. Navigation engine 138 is also configured to generate segmented disk 326 in order to indicate the number of 3D objects included within the off-screen group. As shown, segmented disk 326 indicates that five objects are included within the off-screen group. Navigation engine 138 may also cause the number of off-screen objects to be explicitly displayed along with direction cone 324 and/or segmented disk 326.

In one embodiment, navigation engine 138 may cause direction cone 324 to be displayed with a unique color and/or texture relative to other direction cones not associated with groups of objects (such as, e.g., direction cone 304 of FIG. 3A). Through this technique, navigation engine 138 distinguishes between direction cones indicating groups of 3D objects and those indicating single 3D objects.

When an end-user hovers cursor 302 over direction cone 324, navigation engine 138 may cause various 3D thumbnail images to be displayed that represent the 3D objects within the off-screen group and may scale those 3D thumbnail images to an appropriate size. Additionally, when an end-user selects direction cone 324 using cursor 302, navigation engine 138 may navigate the end-user to the group of 3D objects, i.e. navigation engine 138 may change the camera position associated with the end-user such that the group of 3D objects is on-screen.

Navigation engine 138 is also configured to incorporate one or more direction cones, e.g. one or more direction cones 304 and/or 324 describe above, with various other graphical elements in order to generate different "navigation GUIs," as described in greater detail below in conjunction with FIGS. 4-9.

Figure 4:
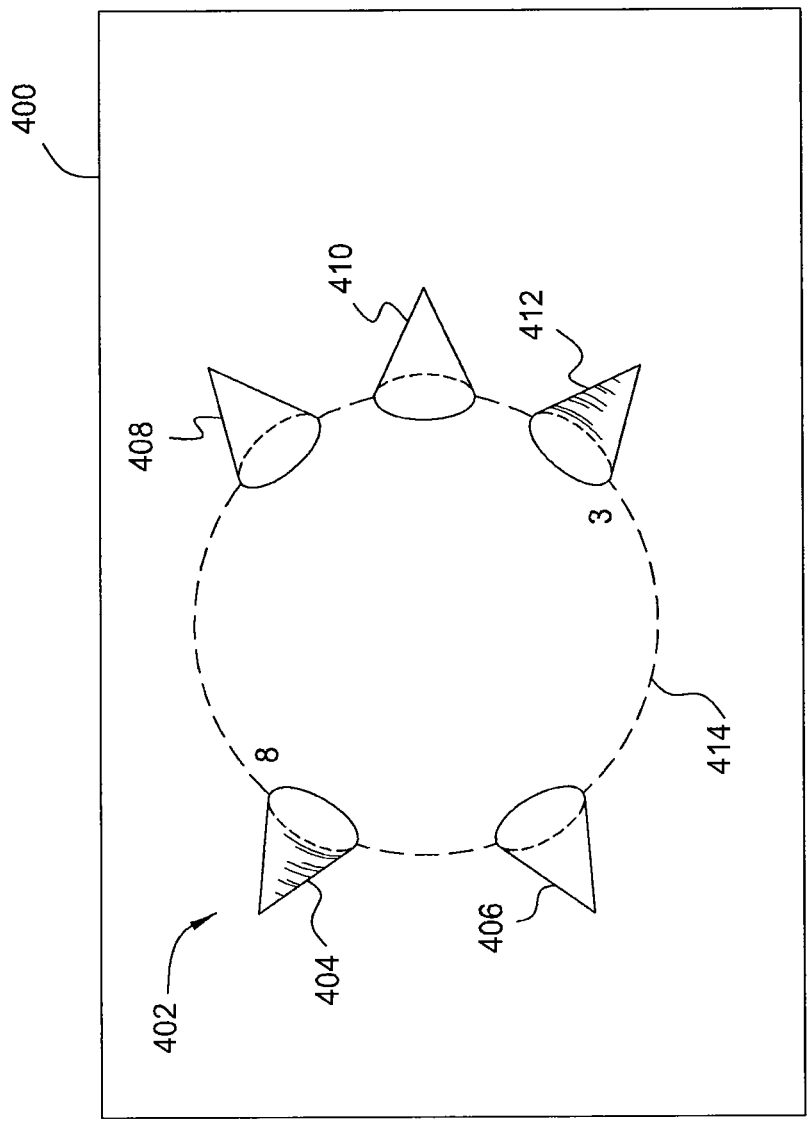

FIG. 4 illustrates a screenshot 400 of the 3D environment associated with multiscale 3D dataset 132, according to one embodiment of the invention. As shown, screenshot 400 includes a cone ring 402. Cone ring 402 is a "navigation GUI" generated by navigation engine 138, as previously described. Cone ring 402 includes direction cones 404, 406, 408, 410, and 412 that are disposed along a two-dimensional (2D) circular boundary 414. Circular boundary 414 is shown in screenshot 400 merely to illustrate the preferred distribution of the direction cones within cone ring 402, and, in general, may not be visible to an end-user.

Navigation engine 138 is configured to generate cone ring 402 in order to indicate 3D objects and/or groups of 3D objects that are currently off-screen, i.e. 3D objects that are not visible to an end-user. Each direction cone included within cone ring 402 is substantially similar to either direction cone 304 or direction cone 324 described above in conjunction with FIGS. 3A and 3B, respectively. For example, direction cones 406, 408, and 410 represent single off-screen 3D objects in similar fashion as direction cone 304 of FIG. 3A. Additionally, direction cones 404 and 412 represent groups of off-screen 3D objects in similar fashion as direction cone 324 of FIG. 3B. As with direction cones 304 and 324, an end-user may hover cursor 302 over one of the direction cones within cone ring 402, and, in response, navigation engine 138 may display one or more 3D thumbnail images. Further, an end-user may select one of the direction cones within cone ring 402, and, in response, navigation engine 138 may navigate the end-user to the 3D object or group of objects represented by that direction cone.

Navigation engine 138 is configured to position cone ring 402 within the 3D environment at a given distance from the end-user, i.e. at a given distance from the camera position associated with the end-user. That distance may be configurable based on input received from the end-user. Navigation 138 is also configured to generate cone ring 402 with a circular boundary 414 having a configurable radius. In one embodiment, navigation engine 138 determines the position and orientation of each direction cone within cone ring 402 based on the current position of the end-user within the 3D environment. In another embodiment, navigation engine 138 may determine the position and orientation of each direction cone within cone ring 402 based on the current position of cone ring 402 within the 3D environment.

In yet another embodiment, navigation engine 138 may dynamically change the position and orientation of each direction cone within cone ring 402 in response to a change in position of the end-user and/or a change in position of cone ring 402. When navigation engine 138 changes the position of a given direction cone within cone ring 402, that direction cone is generally constrained to move along circular boundary 414. In addition, when navigation engine 138 changes the orientation of a given direction cone within cone ring 402, that direction cone is generally constrained to point either towards or away from the center of cone ring 402.

Navigation engine 138 is further configured to add additional direction cones to cone ring 402 when an on-screen object moves off-screen. In this situation, navigation engine 138 adds a direction cone that indicates the off-screen object. In one embodiment, navigation engine 138 may include direction cones within cone ring 402 to indicate both off-screen and on-screen objects. In this embodiment, navigation engine 138 may provide a direction cone pointing towards the center of cone ring 402 when a 3D object resides within circular boundary 414.

In another embodiment, navigation engine 138 may determine whether to indicate a 3D object (or group of 3D objects) with a direction cone based on the position of that 3D object (or group of 3D objects). For example, if a given 3D object is sufficiently far from the current position of the end-user, then navigation engine 138 may not include a direction cone indicating that 3D object within cone ring 402.

As described in greater detail below in conjunction with FIG. 5, navigation engine 138 is further configured to generate a "cone sphere" navigation GUI that may have similar properties to cone ring 402, described above.

Figure 5:
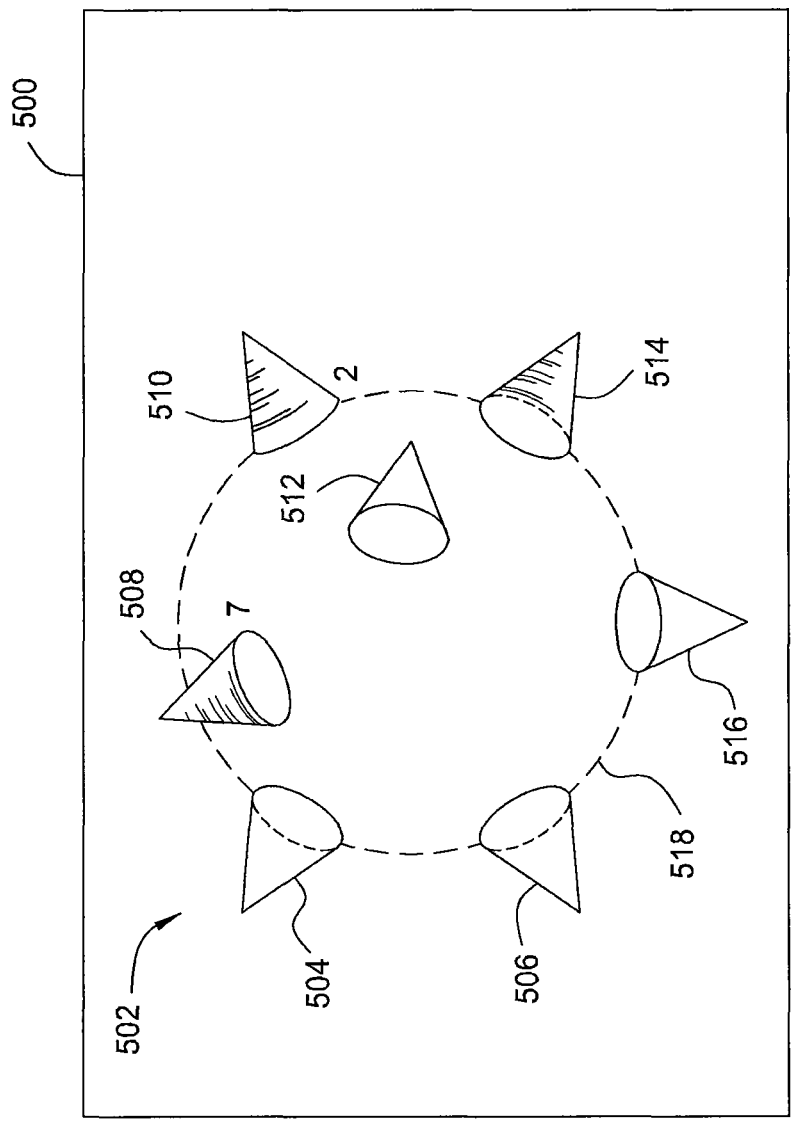

FIG. 5 illustrates a screenshot 500 of the 3D environment associated with multiscale 3D dataset 132, according to one embodiment of the invention. As shown, screenshot 500 includes a cone sphere 502. Cone sphere 502 is a navigation GUI generated by navigation engine 138 and includes direction cones 504, 506, 508, 510, 512, 514, and 516. The direction cones included within cone sphere 502 are disposed along a 3D spherical boundary 518. Spherical boundary 518 is shown in screenshot 500 merely to illustrate the preferred distribution of the direction cones within cone sphere 502, and, in general, may not be visible to an end-user.

As with cone ring 402 described previously, navigation engine 138 is configured to generate cone sphere 502 in order to indicate 3D objects and/or groups of 3D objects that are currently off-screen, i.e. 3D objects that are not visible to an end-user. Each direction cone included within cone sphere 502 is substantially similar to either direction cone 304 or direction cone 324 described above in conjunction with FIGS. 3A and 3B, respectively. For example, direction cones 504, 506, 512, 514, and 516 represent single off-screen 3D objects in similar fashion as direction cone 304 of FIG. 3A. Additionally, direction cones 508 and 510 represent groups of off-screen 3D objects in similar fashion as direction cone 324 of FIG. 3B. As with direction cones 304 and 324, an end-user may hover cursor 302 over one of the direction cones within cone ring 402, and, in response, navigation engine 138 may display one or more thumbnail 3D images. Further, an end-user may select one of the direction cones within cone ring 402, and, in response, navigation engine 138 may navigate the end-user to the 3D object or group of objects represented by that direction cone.

Navigation engine 138 is configured to position cone sphere 502 within the 3D environment at a given distance from the end-user, i.e. at a given distance from the camera position associated with the end-user. That distance may be configurable based on input received from the end-user. Navigation 138 is also configured to generate cone sphere 502 with a spherical boundary 518 having a configurable radius. In one embodiment, navigation engine 138 determines the position and orientation of each direction cone within cone sphere 502 based on the current position of the end-user within the 3D environment. In another embodiment, navigation engine 138 may determine the position and orientation of each direction cone within cone sphere 502 based on the current position of cone sphere 502 within the 3D environment.

In yet another embodiment, navigation engine 138 may dynamically change the position and orientation of each direction cone within cone sphere 502 in response to a change in position of the end-user and/or a change in position of cone sphere 502. When navigation engine 138 changes the position of a given direction cone within cone sphere 502, that direction cone is generally constrained to move along spherical boundary 518. In addition, when navigation engine 138 changes the orientation of a given direction cone within cone sphere 502, that direction cone is generally constrained to point either towards or away from the center of cone sphere 502.

Navigation engine 138 is further configured to add additional direction cones to cone sphere 502 when an on-screen object moves off-screen. In this situation, navigation engine 138 adds a direction cone that indicates the off-screen object. In one embodiment, navigation engine 138 may include direction cones within cone sphere 502 to indicate both off-screen and on-screen objects. In this embodiment, navigation engine 138 may provide a direction cone pointing towards the center of cone sphere 502 when a 3D object resides within spherical boundary 518.

In another embodiment, navigation engine 138 may determine whether to indicate a 3D object (or group of 3D objects) with a direction cone based on the position of that 3D object (or group of 3D objects). For example, if a given 3D object is sufficiently far from the current position of the end-user, then navigation engine 138 may not include a direction cone within cone sphere 502 that indicates the 3D object.

Navigation engine 138 is configured to generate a 2D representation of cone sphere 502 by converting the surface of cone sphere 502 into a 2D plane, as described in greater detail below in conjunction with FIG. 5.

Figure 6:
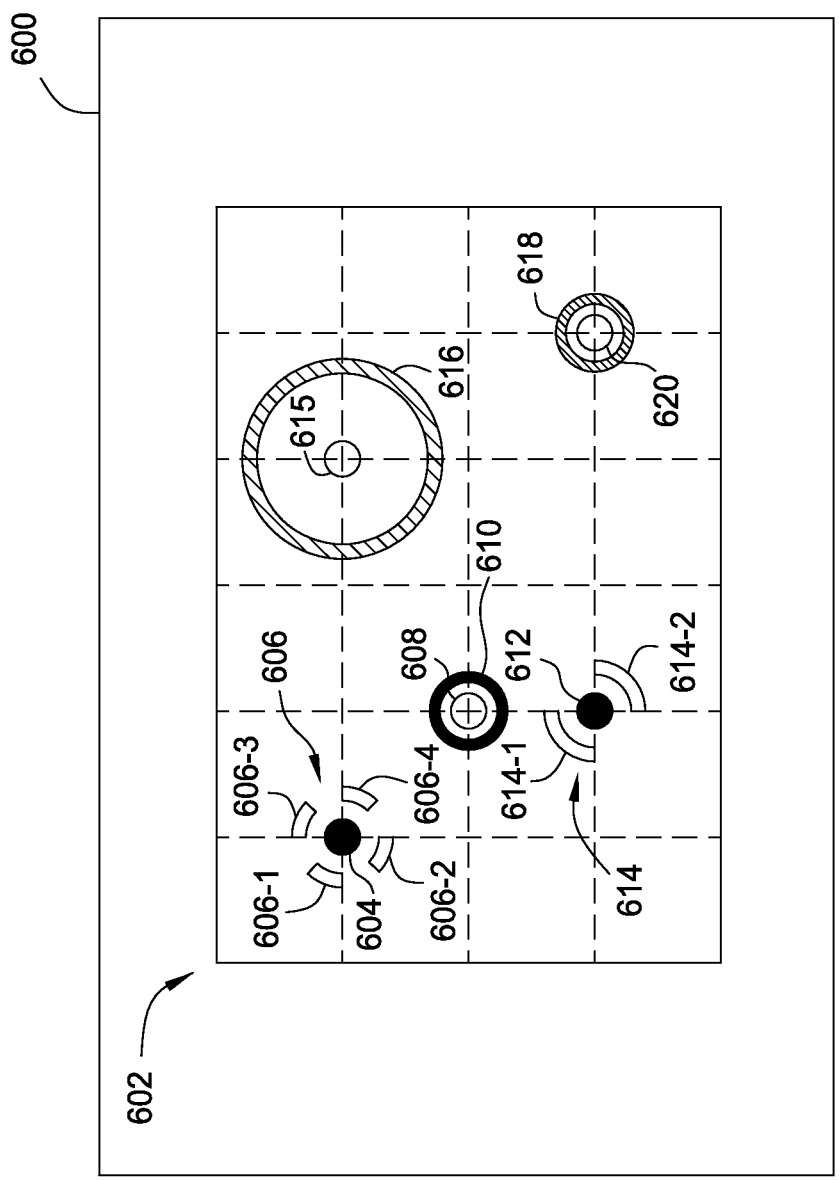

FIG. 6 illustrates a screenshot 600 of the 3D environment associated with multiscale 3D dataset 132 according to one embodiment of the invention. As shown, screenshot 600 includes a grid 602. Navigation engine 138 generates grid 602 by projecting the spherical boundary 518 of cone sphere 502 onto a 2D plane. Grid 602 includes direction cones 604, 608, 610, 612, and 616. The direction cones within grid 602 may correspond directly to direction cones disposed on the surface of cone sphere 502.

Direction cones 608, 610, and 616 represent single off-screen 3D objects, similar to direction cone 304 of FIG. 3A. Additionally, direction cones 608, 6154, and 620 also include extended bases 610, 616, and 618, respectively. The extended base surrounding a given direction cone is shaded based on the distance from the current position of the end-user to the 3D object associated with that cone. In this fashion, extended bases 610, 616, and 618 indicate the distance from the current position of the end-user to the 3D objects associated with the direction cones corresponding to those extended bases.

Direction cones 604 and 612 represent groups of off-screen 3D objects, similar to direction cone 324 of FIG. 3B. Direction cones 604 and 612 also include segmented disks 606 and 614, respectively. Segmented disk 606 includes disk segments 606-1 through 606-4, while segmented disk 614 includes disk segments 614-1 and 614-2. Additionally, like extended bases 610, 616, and 618, the segmented disk surrounding a given direction cone is shaded based on the distance to the 3D object associated with that cone. In this fashion, segmented disks 606 and 614 indicate the distance to the 3D objects associated with the direction cones corresponding to those segmented disks. In one embodiment, the end-user may zoom into one of direction cones 604 or 614, and, in response, navigation engine 138 then displays 3D thumbnail images corresponding to the 3D objects within the group represented by that direction cone.

The navigation GUIs described in conjunction with FIGS. 4-6 may be further extended to display representations of 3D objects and groups of 3D objects that are positioned off-screen, as described in greater detail below in conjunction with FIGS. 7-9.

Figure 7A:
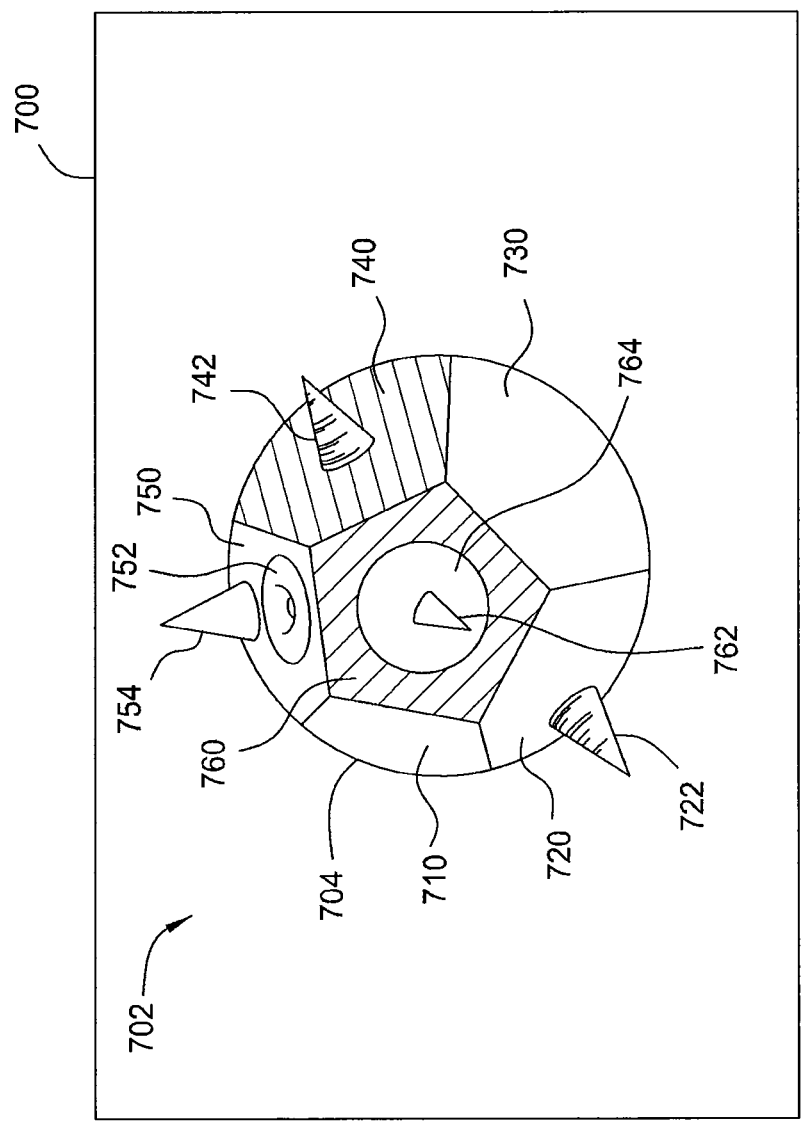

FIG. 7A illustrates a screenshot 700 of the 3D environment associated with multiscale 3D dataset 132, according to one embodiment of the invention. As shown, screenshot 700 includes a mirror ball 702. Mirror ball 702 is another navigation GUI generated by navigation engine 138. Mirror ball 702 has a reflective surface 704 on which images of off-screen objects may appear. Reflective surface 704 of mirror ball 702 is divided into Voronoi regions 710, 720, 730, 740, 750, and 760. Each Voronoi region on reflective surface 704 may display a reflected image of a different region of the surrounding 3D environment. Each Voronoi region may also display a reflected image of a 3D object or group of 3D objects residing within the region of the 3D environment corresponding to that Voronoi region. For example, Voronoi region 760 reflects an image 764 of an off-screen ball. Likewise, Voronoi region 750 reflects an image 752 of an off-screen torus. Navigation engine 138 is configured to scale images reflected by reflective surface 704 so that every image reflected by reflective surface 704 has a similar size.

When a given Voronoi region reflects an image of the 3D environment that includes a 3D object or a group of 3D objects, navigation engine 138 includes a direction cone within that Voronoi region. As shown, Voronoi region 720 includes direction cone 722, Voronoi region 740 includes direction one 742, Voronoi region 750 includes direction cone 754, and Voronoi region 760 includes direction cone 762. The direction cone within a given Voronoi region may be substantially similar to either direction cone 304 or direction cone 324 described above in conjunction with FIGS. 3A and 3B, respectively.

In one embodiment, navigation engine 138 determines the height of a direction cone within a Voronoi region based on the distance between mirror ball 702 and the 3D object or group of 3D objects associated with that Voronoi region and/or the camera position of an end-user within the 3D environment. In another embodiment, navigation engine 138 is configured to shade each Voronoi region based on the distance between mirror ball 702 and the 3D object or group of 3D objects associated with that Voronoi region and/or the camera position of an end-user within the 3D environment. For example, as shown, Voronoi regions 740 and 760 appear shaded, indicating that the corresponding 3D objects or group of 3D objects is relatively far away from mirror ball 702.

Navigation engine 138 is also configured to generate multiple mirror balls within the 3D environment in order to allow an end-user to navigate groups of 3D objects, as discussed in greater detail below in conjunction with FIG. 7B.

Figure 7B:
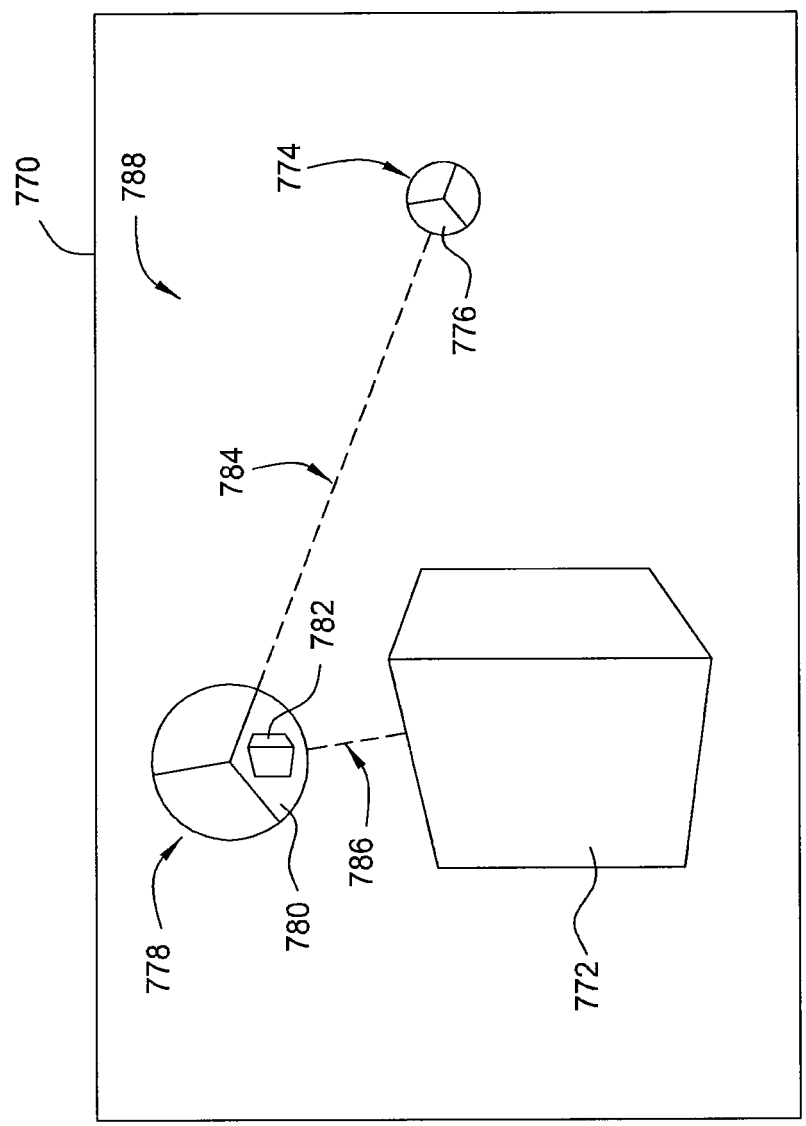

FIG. 7B illustrates a screenshot 770 of the 3D environment associated with multiscale 3D dataset 132, according to one embodiment of the invention. As shown, screenshot 770 includes a mirror ball constellation 788. Mirror ball constellation 788 is another navigation GUI generated by navigation engine 138 and includes parent mirror ball 774 and child mirror ball 778 disposed relative to a 3D object 772. In general, mirror ball constellation 788 allows an end-user to view child mirror ball 778 via parent mirror ball 774. Mirror ball constellation 788 also allows an end-user to view 3D object 772 via child mirror ball 778.

Navigation engine 138 is configured to generate and position parent mirror ball 774 and child mirror ball 778 relative to 3D object 772, which may be part of a larger group of 3D objects, in order to allow better viewing of that group of 3D objects. Auxiliary line 784 indicates the parent-child relationship between parent mirror ball 774 and child mirror ball 778, while auxiliary line 786 indicates a relationship between child mirror ball 778 and 3D object 772. Each of parent mirror ball 774 and child mirror ball 778 is substantially similar to mirror ball 702 described above in conjunction with FIG. 7A. Parent mirror ball includes Voronoi region 776, while child mirror ball includes Voronoi region 780. As shown, Voronoi region 780 reflects an image 782 of 3D object 772.

When using mirror ball constellation 788 to navigate the 3D environment, an end-user typically relies on parent mirror ball 774 to identify 3D objects and groups of 3D objects. Navigation engine 138 is configured to cause parent mirror ball 774 to represent groups of 3D objects using child mirror ball 778. Accordingly, Voronoi region 776 may reflect an image of child mirror ball 778, which, in turn, may represent 3D object 772. In this fashion, navigation engine 138 is configured to generate a spatial hierarchy of parent-child mirror balls. Navigation engine 138 also allows an end-user to navigate that spatial hierarchy. For example, an end-user could select the reflected image of child mirror ball 778 within parent mirror ball 774, and, in response, navigation engine 138 would move the camera position of the end-user to be directed towards child mirror ball 778. Further, an end-user could then select image 782, and, in response, navigation engine 138 would move the camera position of the end-user to be directed towards 3D object 772. In one embodiment, parent mirror ball 774 and child mirror ball 778 each corresponds to a different 3D dataset within multiscale 3D dataset 132.

Navigation engine 138 is also configured to generate a 2D representation of a mirror ball by projecting the surface of that mirror ball into 2D space, as described in greater detail below in conjunction with FIG. 8.

Figure 8:
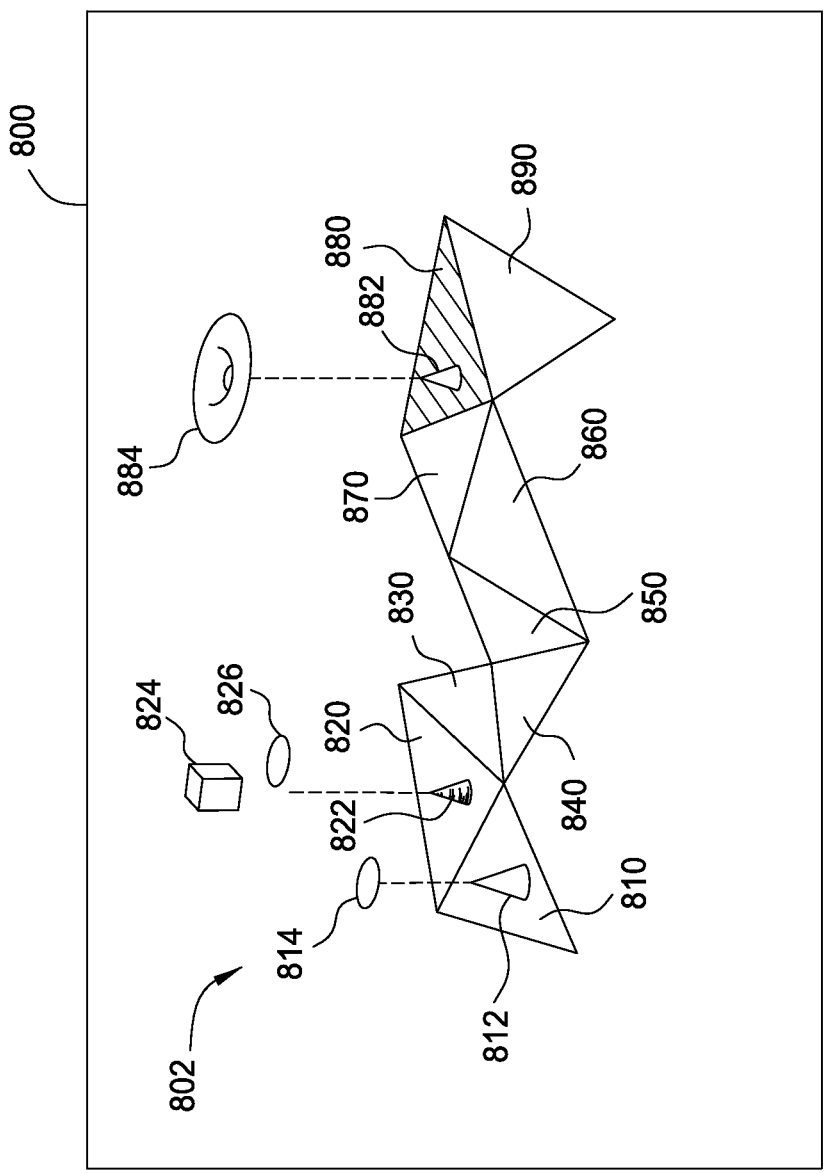

FIG. 8 illustrates a screenshot 800 of the 3D environment associated with multiscale 3D dataset 132, according to one embodiment of the invention. As shown, screenshot 800 includes an unfolded surface 802. Navigation engine 138 generates unfolded surface 802 by unfolding the reflective surface of a mirror ball and projecting that reflective surface onto a 2D plane. Persons skilled in the art will recognize that unfolded surface 802 may be generated based on a mirror ball using any technically feasible algorithm for unwrapping the surface of a sphere. Unfolded surface 802 includes Voronoi regions 810, 820, 830, 840, 850, 860, 870, 880, and 890. Voronoi regions 810, 820, and 880 include direction cones 812, 822, and 882, respectively.

A given direction cone disposed within a Voronoi region of unfolded surface 802 indicates an object or group of objects associated with that Voronoi region. For example, direction cone 812 indicates 3D object 814, direction cone 822 indicates a group of 3D objects that includes 3D objects 824 and 826, and direction cone 882 indicates 3D object 884. Navigation engine 138 is configured to position a given 3D object or group of 3D objects associated with a given direction cone at a particular height above that direction cone. Navigation engine 138 determines that height based on the distance between the camera position of the end-user and the 3D object or group of 3D objects. As with mirror ball 702 described above in conjunction with FIG. 7A, and end-user may navigate to specific 3D objects or groups of 3D objects using unfolded surface 902.

Navigation engine 138 is also configured to generate an "anamorphic lens" navigation GUI that allows an end-user to view a compressed representation of the 3D environment, as described in greater detail below in FIG. 9.

Figure 9:
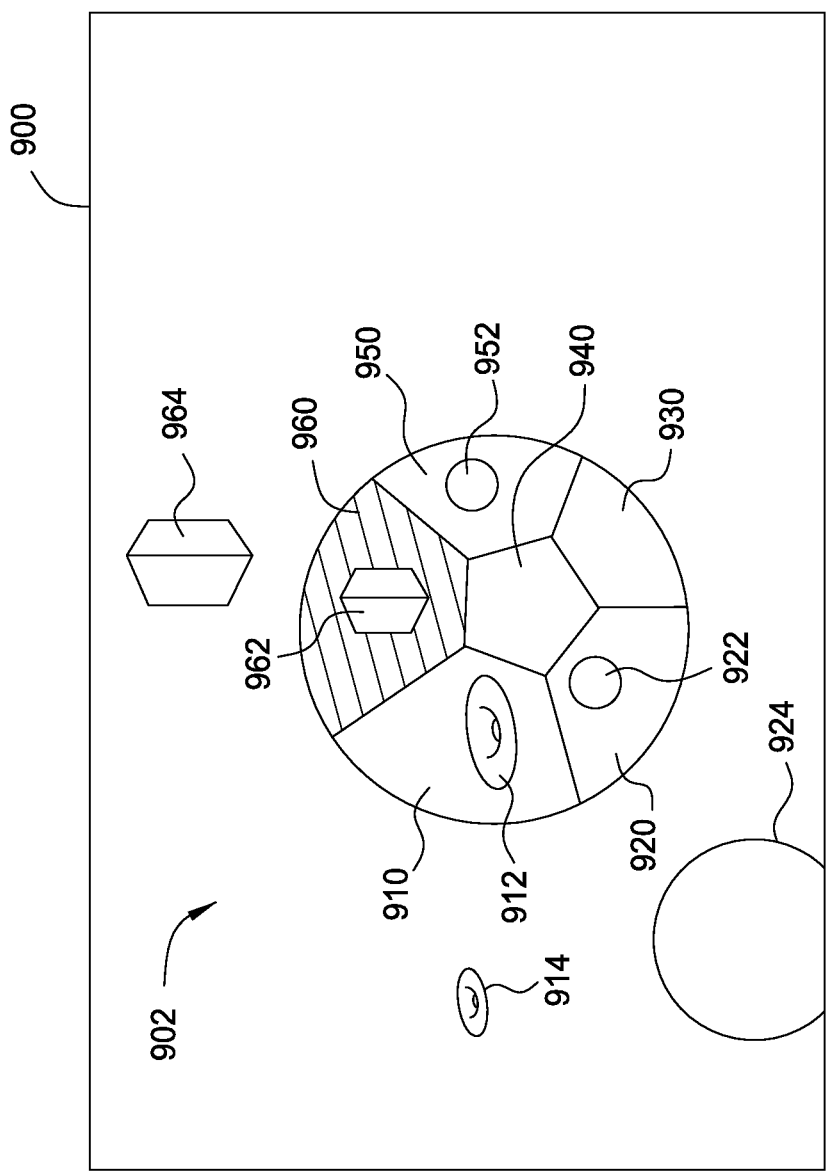

FIG. 9 illustrates a screenshot 900 of the 3D environment associated with multiscale 3D dataset 132, according to one embodiment of the invention. As shown, screenshot 900 includes an anamorphic lens 902, as well as 3D objects 914, 924, and 964. The surface of anamorphic lens 902 is divided into Voronoi regions 910, 920, 930, 940, 950, and 960. Each Voronoi region may display an image that corresponds to a different region of the 3D environment. Navigation engine 138 causes anamorphic lens 902 to display images from regions of the 3D environment that lie within a 180 degree field of view, both horizontally and vertically. Accordingly, anamorphic lens 902 may display images of both on-screen and off-screen 3D objects.

Voronoi region 910 displays an image 912 of 3D object 914, Voronoi region 920 displays an image 922 of 3D object 924, Voronoi region 950 displays an image 952 of an off-screen 3D object, and Voronoi region 960 displays an image 962 of 3D object 964. Navigation engine 138 is configured to cause each Voronoi region to be shaded based on the distance from the camera position of the end-user to the 3D object or group of 3D objects associated with that Voronoi region. For example, 3D object 924 is relatively close to the camera position of the end-user, and so Voronoi region 920 is lightly colored. Conversely, 3D object 964 is relatively far away from the camera position of the end-user, and so Voronoi region 960 is shaded proportionally.

Navigation engine 138 is also configured to scale images within each Voronoi region so that every image has a similar size. For example, although 3D object 924 appears quite large while 3D object 914 appears quite small, the images corresponding to those 3D objects (images 922 and 912, respectively) appear similar in size. In one embodiment, navigation engine 138 implements anamorphic lens 902 in conjunction with mirror ball 702 in order to display 3D objects and groups of 3D objects that reside behind the camera position of the end-user.

Those skilled in the art will recognize that navigation engine 138 may implement any of the navigation GUIs described above in conjunction with FIGS. 3A-9, and any combination thereof, when allowing an end-user to navigate the 3D environment associated with multiscale 3D dataset 132. In addition, navigation engine 138 may select a particular navigation GUI based on, among other things, multiscale 3D dataset 132, a particular 3D dataset within multiscale 3D dataset 132, user input and/or user preferences, or a current scale of the 3D environment. Further, navigation engine 138 may generate a spatial hierarchy of parent-child relationships within the 3D environment by associating any of the navigation GUIs together.

Figure 10:
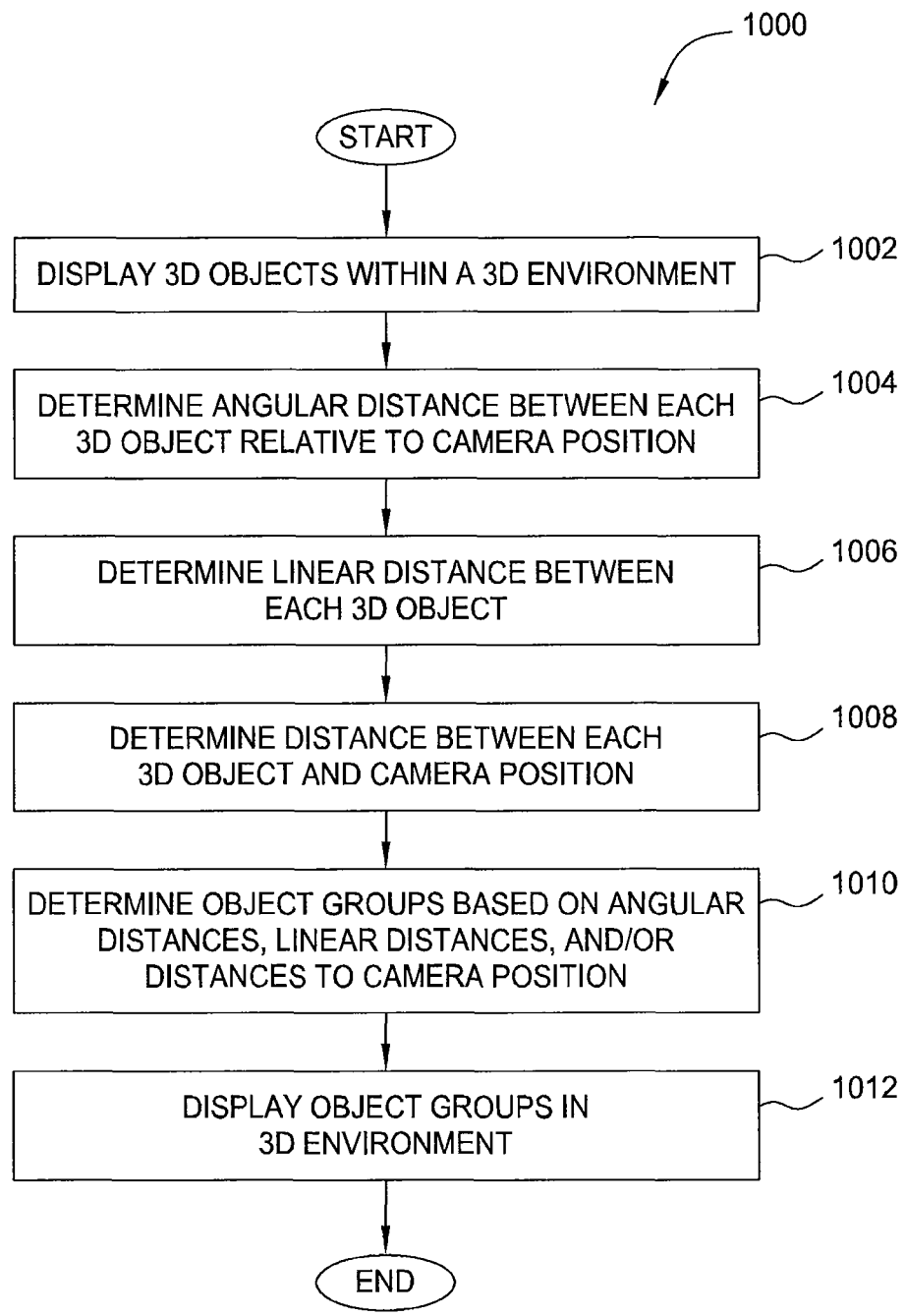
FIG. 10 is a flowchart of method steps for visualizing a multiscale 3D dataset, according to one embodiment of the invention.

FIG. 10 is a flowchart of method steps for visualizing multiscale 3D dataset 132, according to one embodiment of the invention. Although the method steps are described in conjunction with the system of FIGS. 1A and 1B, persons skilled in the art will understand that any system configured to perform the method steps, in any order, is within the scope of the invention.

As shown, the method 1000 starts at step 1002, where visualization engine 134 within multiscale data engine 130 displays one or more 3D objects within a 3D environment. Visualization engine 134 generates the 3D environment based on multiscale 3D dataset 132. At step 1004, visualization engine 134 determines the linear distance between each 3D object. At step 1006, visualization engine 134 determines the angular distance between each 3D object relative to a camera position associated with an end-user. In practice, visualization engine 134 may render the 3D environment for display from the perspective of that camera position. At step 1008, visualization engine 134 determines the distance between each 3D object and the camera position associated with the end-user.

At step 1010, visualization engine 134 determines one or more object groups based on the linear distances between the 3D objects, the angular distances between the 3D objects relative to the camera position, and/or the distances between the 3D objects and the camera position. At step 1012, visualization engine 134 causes the object groups to be displayed within the 3D environment. By implementing the method 1000, visualization engine 134 may "clean up" the 3D environment by reducing the number of visible 3D objects.

Figure 11:
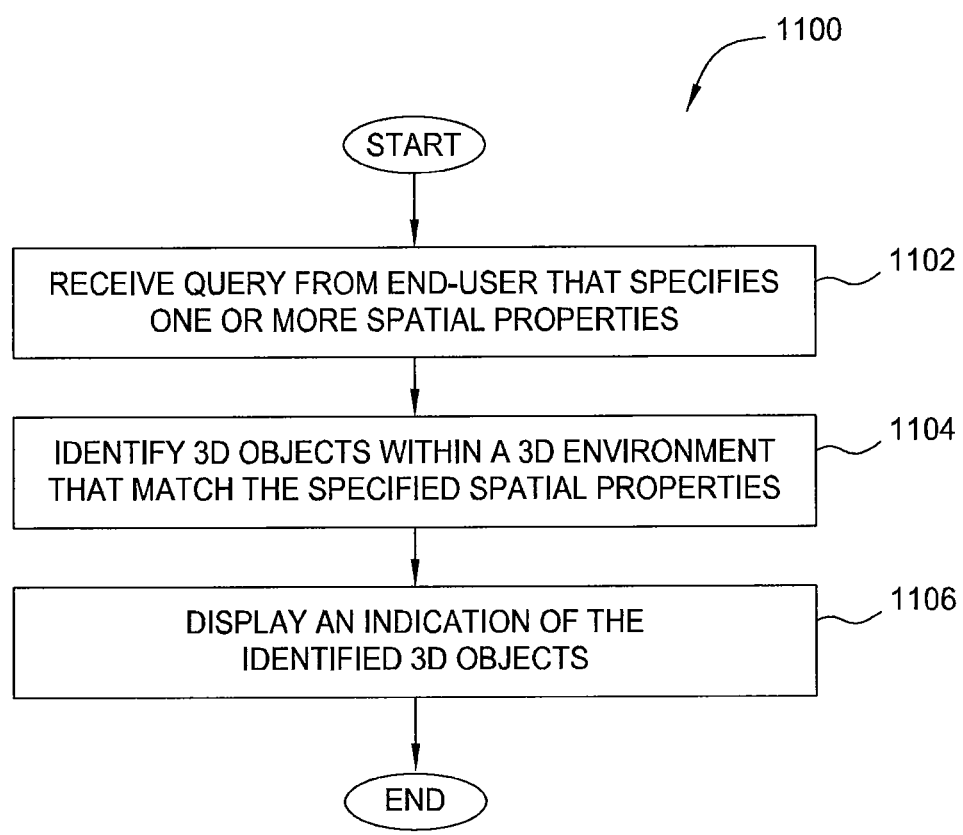
FIG. 11 is a flowchart of method steps for querying a multiscale 3D dataset, according to one embodiment of the invention.

FIG. 11 is a flowchart of method steps for querying multiscale 3D dataset 132, according to one embodiment of the invention. Although the method steps are described in conjunction with the system of FIGS. 1A and 1B, persons skilled in the art will understand that any system configured to perform the method steps, in any order, is within the scope of the invention.

As shown, the method 1100 starts at step 1102, where query engine 136 within multiscale data engine 130 receives a query from an end-user that specifies one or more spatial properties associated with a desired set of 3D objects. The spatial properties could be, for example, a maximum distance to the camera position. In one embodiment, the query may also specify non-spatial properties, such as a category associated with the desired 3D objects. At step 1104, query engine 136 identifies any 3D objects that match the spatial properties specified in the query. Those 3D objects reside within the 3D environment associated with multiscale 3D dataset 132. At step 1106, query engine 136 causes an indication of the identified 3D objects to be displayed. The indication could be, for example, a glow surrounding the identified 3D objects. By implementing the method 1100, query engine 136 allows an end-user to identify 3D objects that match specified properties.

Figure 12:
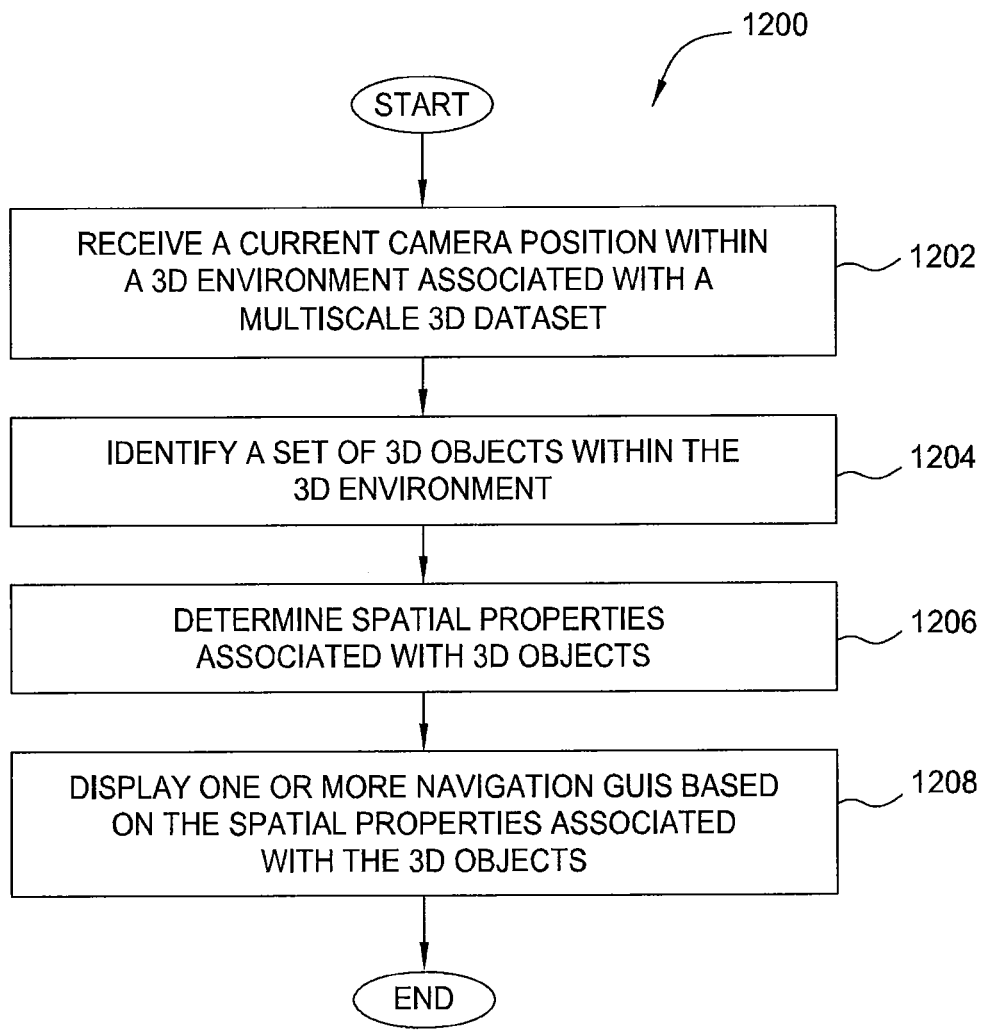
FIG. 12 is a flowchart of method steps for generating a navigation GUI based on a multiscale 3D dataset, according to one embodiment of the invention.

FIG. 12 is a flowchart of method steps for generating a navigation GUI based on multiscale 3D dataset 132, according to one embodiment of the invention. Although the method steps are described in conjunction with the system of FIGS. 1A and 1B, persons skilled in the art will understand that any system configured to perform the method steps, in any order, is within the scope of the invention.

As shown, the method 1200 starts at step 1202, where navigation engine 138 within multiscale data engine 130 receives a current camera position within a 3D environment associated with multiscale 3D dataset 132. The current camera position may be used to render an image of the 3D environment for display to an end-user. At step 1204, navigation engine 138 identifies a set of 3D objects within the 3D environment. The 3D objects could be individual 3D objects or groups of 3D objects. At step 1206, navigation engine 138 determines one or more spatial properties associated with the 3D objects. At step 1208, navigation engine 138 causes one or more navigation GUIs to be displayed based on the one or more spatial properties.

Persons skilled in the art will recognize the method 1200 may be implemented repeatedly as an end-user navigates through the 3D environment using the navigation GUI. For example, after navigation engine 138 causes a navigation GUI to be displayed by implementing the method 1200, an end-user may manipulate the navigation GUI in order to move the camera to a different position within the 3D environment. Navigation engine 138 may then cause another navigation GUI to be displayed by again implementing the method 1200. By thus implementing the method 1200 one or more times, navigation engine 138 may cause various different navigation GUIs to be displayed.

In sum, a multiscale data engine is configured to access a multiscale 3D dataset and to generate a 3D environment based on that multiscale 3D dataset. The multiscale data engine manipulates the 3D environment in order to group various 3D objects within that environment. The multiscale data engine may also conduct a search of the 3D environment in order to identify 3D objects that match search criteria received from an end-user. In addition, the multiscale data engine is configured to generate various navigation GUIs that allows the end-user to navigate the 3D environment. Advantageously, an end-user is provided with various techniques for interacting with a complex 3D environment that includes observable properties at a wide variety of different scales. Such approaches are crucial to engaging users with the visually immersive details that are associated with each distinct scale of such 3D environments.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. The invention is set forth in the following claims.

What is claimed:

1. A computer-implemented method for generating a navigation graphical user interface (GUI) for navigating a three-dimensional (3D) environment associated with a multiscale 3D dataset, the method comprising:
   receiving a current position within the 3D environment, wherein a visible portion of the 3D environment is rendered for display based on a perspective from the current position, and a first group of 3D objects is located within a non-visible portion of the 3D environment; and
   causing both a directional object indicator and a first 3D thumbnail image representing the first group of 3D objects to be displayed within the visible portion of the 3D environment, wherein the directional object indicator indicates a direction in which the first group of 3D objects is located relative to the current position, and the first 3D thumbnail image representing the first group of 3D objects is displayed proximate to the directional object indicator,
   wherein the first group of 3D objects includes 3D objects selected based on at least one of:
      an angular distance between the 3D objects from the perspective from the current position being less than a first angular threshold, and
      linear distances between the current position and each 3D object included in the group of 3D objects being within a first linear threshold of each other.

2. The computer-implemented method of claim 1, wherein the position of the directional object indicator within the visible portion of the 3D environment is constrained to a circular boundary also residing within the visible portion, and further comprising:
   receiving an updated position within the 3D environment;
   repositioning the directional object indicator on the circular boundary based on the updated position; and
   reorienting the directional object indicator to indicate the location of the first group of 3D objects within the non-visible portion of the 3D environment relative to the updated position.

3. The computer-implemented method of claim 1, wherein the position of the directional object indicator within the visible portion of the 3D environment is constrained to a spherical boundary also residing within the visible portion.

4. The computer-implemented method of claim 3, further comprising:
   receiving an updated position within the 3D environment;
   repositioning the directional object indicator on the spherical boundary based on the updated position; and
   reorienting the directional object indicator to indicate the location of the first group of 3D objects within the non-visible portion of the 3D environment relative to the updated position.

5. The computer implemented method of claim 3, further comprising projecting the spherical boundary onto a two-dimensional (2D) plane residing within the visible portion of the 3D environment, and causing the directional object indicator to appear on the 2D plane, wherein the directional object indicator indicates the distance between the current position and the first group of 3D objects.

6. The computer-implemented method of claim 1, wherein the directional object indicator comprises a 3D cone, and a tip of the 3D cone points in the direction in which the first group of 3D objects is located within the non-visible portion of the 3D environment relative to the current position.

7. A non-transitory computer-readable medium including instructions that, when executed by a processing unit, cause the processing unit to generate a navigation GUI for navigating a 3D environment associated with a multiscale 3D dataset, by performing the steps of:
   receiving a current position within the 3D environment, wherein a visible portion of the 3D environment is rendered for display based on a perspective from the current position, and a first group of 3D objects is located within a non-visible portion of the 3D environment; and
   causing both a directional object indicator and a first 3D thumbnail image representing the first group of 3D objects to be displayed within the visible portion of the 3D environment, wherein the directional object indicator indicates a direction in which the first group of 3D objects is located relative to the current position, and the first 3D thumbnail image representing the first group of 3D objects is displayed proximate to the directional object indicator, wherein the first group of 3D objects includes 3D objects selected based on at least one of:
an angular distance between the 3D objects from the perspective from the current position being less than a first angular threshold, and
linear distances between the current position and each 3D object included in the group of 3D objects being within a first linear threshold of each other.

8. The non-transitory computer-readable medium of claim 7, wherein the position of the directional object indicator within the visible portion of the 3D environment is constrained to a circular boundary also residing within the visible portion, and further comprising:
receiving an updated position within the 3D environment;
repositioning the directional object indicator on the circular boundary based on the updated position; and
reorienting the directional object indicator to indicate the location of the first group of 3D objects within the non-visible portion of the 3D environment relative to the updated position.

9. The non-transitory computer-readable medium of claim 7, wherein the position of the directional object indicator within the visible portion of the 3D environment is constrained to a spherical boundary also residing within the visible portion.

10. The non-transitory computer-readable medium of claim 9, further comprising the steps of:
receiving an updated position within the 3D environment;
repositioning the directional object indicator on the spherical boundary based on the updated position; and
reorienting the directional object indicator to indicate the location of the first group of 3D objects within the non-visible portion of the 3D environment relative to the updated position.

11. The non-transitory computer-readable medium of claim 9, further comprising projecting the spherical boundary onto a 2D plane residing within the visible portion of the 3D environment, and causing the directional object indicator to appear on the 2D plane, wherein the directional object indicator indicates the distance between the current position and the first group of 3D objects.

12. The non-transitory computer-readable medium of claim 7, wherein the directional object indicator comprises a 3D cone, and a tip of the 3D cone points in the direction in which the first group of 3D objects is located within the non-visible portion of the 3D environment relative to the current position.

13. The non-transitory computer-readable medium of claim 7, wherein the first 3D thumbnail image of the first group of 3D objects is displayed in response to a cursor being placed over the directional object indicator.

14. The non-transitory computer-readable medium of claim 7, further comprising the steps of:
determining that a second 3D object has moved from the visible portion of the 3D environment to the non-visible portion of the 3D environment; and
in response, causing a second directional object indicator to be displayed within the visible portion of the 3D environment, wherein the second directional object indicator indicates a direction in which the second 3D object is located relative to the current position.

15. A computing device that generates a navigation GUI for navigating a 3D environment associated with a multi-scale 3D dataset, the computing device comprising:
a memory that includes instructions; and
a processor that is coupled to the memory and, when executing the instructions is configured to:
receive a current position within the 3D environment, wherein a visible portion of the 3D environment is rendered for display based on a perspective from the current position, and a first group of 3D objects is located within a non-visible portion of the 3D environment; and
cause both a directional object indicator and a first 3D thumbnail image representing the first group of 3D objects to be displayed within the visible portion of the 3D environment, wherein the directional object indicator indicates a direction in which the first group of 3D objects is located relative to the current position, and the first 3D thumbnail image representing the first group of 3D objects is displayed proximate to the directional object indicator,
wherein the first group of 3D objects includes 3D objects selected based on at least one of:
an angular distance between the 3D objects from the perspective from the current position being less than a first angular threshold, and
linear distances between the current position and each 3D object included in the group of 3D objects being within a first linear threshold of each other.

16. The computing device of claim 15, wherein the directional object indicator comprises a 3D cone, and a tip of the 3D cone points in the direction in which the first group of 3D objects is located within the non-visible portion of the 3D environment relative to the current position.

17. A computer-implemented method for generating a navigation graphical user interface (GUI) for navigating a three-dimensional (3D) environment associated with a multiscale 3D dataset, the method comprising:
receiving a current position within the 3D environment, wherein a visible portion of the 3D environment is rendered for display based on a perspective associated with the current position;
causing a directional object indicator to be displayed within the visible portion of the 3D environment, wherein the directional object indicator indicates a direction in which a group of 3D objects is located within a non-visible portion of the 3D environment relative to the current position;
causing a first thumbnail image that represents the group of 3D objects to be displayed proximate to the directional object indicator; and
causing a segmented disk to be displayed proximate to the directional object indicator, wherein a number of segments included in the segmented disk reflects a number of 3D objects included in the group of 3D objects.

18. A non-transitory computer-readable medium including instructions that, when executed by a processing unit, cause the processing unit to generate a navigation GUI for navigating a 3D environment associated with a multiscale 3D dataset, by performing the steps of:
receiving a current position within the 3D environment, wherein a visible portion of the 3D environment is rendered for display based on a perspective associated with the current position;
causing a directional object indicator to be displayed within the visible portion of the 3D environment, wherein the directional object indicator indicates a direction in which a group of 3D objects is located within a non-visible portion of the 3D environment relative to the current position; and causing a first thumbnail image that represents the group of 3D objects to be displayed proximate to the directional object indicator; and causing a segmented disk to be displayed proximate to the directional object indicator, wherein a number of segments included in the segmented disk reflects a number of 3D objects included in the group of 3D objects.

19. A computing device that generates a navigation GUI for navigating a 3D environment associated with a multi-scale 3D dataset, comprising:

a memory that includes instructions; and a processor that is coupled to the memory and, when executing the instructions is configured to:

receive a current position within the 3D environment, wherein a visible portion of the 3D environment is rendered for display based on a perspective associated with the current position;

cause a directional object indicator to be displayed within the visible portion of the 3D environment, wherein the directional object indicator indicates a direction in which a group of 3D objects is located within a non-visible portion of the 3D environment relative to the current position;

cause a first thumbnail image that represents the group of 3D objects to be displayed proximate to the directional object indicator; and causing a segmented disk to be displayed proximate to the directional object indicator, wherein a number of segments included in the segmented disk reflects a number of 3D objects included in the group of 3D objects.

* * * * *